United States Patent [19]

Hughes-Hartogs

[11] Patent Number: 5,479,418
[45] Date of Patent: Dec. 26, 1995

[54] ERROR AND LOSS CORRECTION IN A DATA BASE STORED ON A TWO DIMENSIONAL MEDIUM AND METHOD

[75] Inventor: Dirk Hughes-Hartogs, Morgan Hill, Calif.

[73] Assignee: Canon Inc., Tokyo, Japan

[21] Appl. No.: 911,695

[22] Filed: Jul. 10, 1992

[51] Int. Cl.$^6$ .................................................. G06F 11/10
[52] U.S. Cl. ........................................ 371/40.1; 371/37.4
[58] Field of Search .................................. 371/38.1, 39.1, 371/40.1–40.4, 37.3, 37.1, 37.4, 37.5

[56] References Cited

U.S. PATENT DOCUMENTS

| | | | |
|---|---|---|---|
| 4,013,997 | 3/1977 | Treadwell, III | 371/40.1 |
| 4,105,997 | 8/1978 | McGinn | 371/40.1 |
| 4,794,239 | 12/1988 | Allais | 235/462 |
| 4,852,101 | 7/1989 | Kobayashi et al. | 371/40 |
| 5,070,504 | 12/1991 | Bossen et al. | 371/37.1 |
| 5,296,693 | 3/1994 | Hughes-Hartogs | 235/494 |

FOREIGN PATENT DOCUMENTS

| | | | |
|---|---|---|---|
| PCT/US87/02547 | 4/1988 | WIPO | G11B 27/19 |

OTHER PUBLICATIONS

Electronics and Communication Engineering Journal vol. 2, No. 6, Dec. 1990, London, GB; pp. 213–220 XP178579. P. G. Farrel "Coding as a cure for communication calamities: the successes and failures of error control".

European Search Report for application EP 93 30 5120 3 pages (including cover letter) dated 6, Apr. 1994.
Radio Fernsehen Elektronik Oct 1990 Berlin pp. 638–650 by Gerhard Hohmuth p. 639—para 1—FIG. 27.

Primary Examiner—Roy N. Envall, Jr.
Assistant Examiner—Thomas E. Brown
Attorney, Agent, or Firm—Paul Hentzel; Edward J. Radlo

[57] ABSTRACT

A digital data base 10 having record data codes representing an initial digital record is printed at predetermined code sites 12 within two dimensional code storage area 14 on the surface of on base medium 10B. The digital data base includes redundant check codes and one or more redundant check-check codes for permitting data error and data loss correction. The two dimensional code storage area has a coordinate system for defining code positions therein. The code sites are physically positioned within the code storage area at predetermined coordinates. A plurality of error checking sets are formed by the code sites, each containing one or more data codes and one or more check codes. The bits in the check codes in each error checking set are determined by the bits in the data codes of the same error checking set, and are in error correcting relationship therewith. Each data code and each check code are included in "L" error checking sets to provide "L" levels of inter-locking error checking and correcting. In addition, a of plurality error checking-checking sets are also formed by the code sites. Each error checking-checking set contains one or more check codes and one or more check-check codes in error correcting relationship therewith. Each check code and each check-check code are also included in "L" error checking-checking.

32 Claims, 4 Drawing Sheets

ERROR AND LOSS CORRECTION IN A DATA BASE STORED ON A TWO DIMENSIONAL MEDIUM AND METHOD

TECHNICAL FIELD

This invention relates to a data base correctable against error and loss and method of correction; and more particularly to such a data base stored on the surface of a two dimensional base medium.

BACKGROUND

Heretofore, digital data has been stored on IBM punch cards as bit punch-outs within a row and column matrix of bit positions across on the card. The data was entered along the rows of the card from left to right starting with the top row. The matrix included a row of redundant parity bits along the bottom row and a column of parity bits along the right hand column, for detecting and correcting small errors. Processing errors introduced by electronic aberrations such as low signal-to-noise caused single bit errors and multiple bit errors ("burst" errors) in the serial data stream. The parity bits permitted the detection and correction of short electronic burst errors which were limited to a single row of punch-outs. However, larger burst errors extending over several rows could not be corrected with these row and column parity bits. In addition, loss of data due to "blot" impairments in the physical structure of the card extending across several adjacent rows and columns could not be corrected with these parity bits.

Printed bar codes arranged in a row-column matrix have been employed with limited error correction; as disclosed in an article entitled "Information Encoding with Two Dimensional Bar Codes" by Theo Pavlidis et al, appearing in June 1992 edition of the IEEE at pages 18–28. FIG. 9 of this publication shows a row of checksums in code PDF417 format.

SUMMARY

It is therefore an object of this invention to provide a two dimensional data base and method with improved error detection and correction capabilities.

It is another object of this invention to provide such a data base and method which can correct "blot" errors caused by impairments in the base medium.

It is a further object of this invention to provide such a data base and method which can correct blot errors introduced by long term storage.

It is a further object of this invention to provide such a data base and method in which the data base is permutated and inverse permutated to reduce the effect of blot errors.

It is a further object of this invention to provide such a data base and method in which the data base may be corrected and refreshed.

Briefly, these and other objects of the present invention are accomplished by providing a digital data base having record data codes representing an initial digital record, and having redundant check codes and one or more redundant check-check codes. The codes are stored in a two dimensional code storage area on the surface of the base medium at defined positions therein. The codes have code bit states defined by the presence or absence of toner material deposited on the base medium. A plurality of error checking sets are formed by the code sites, each containing one or more data codes and one or more check codes. The bits in the check codes are determined by the bits in the data codes and are in error correcting relationship therewith. Each data code site and each check code site are included in "L" error checking sets to provide "L" levels of inter-locking error checking. A plurality of error checking-checking sets formed by the code sites, each containing one or more check codes and one or more check-check codes. Each check code site and each check-check code site are also included in "L" error checking-checking sets. The objects are further accomplished by the method of storing and retrieving and correcting the digital data base. A base medium is provided for carrying the codes of the digital data base. The codes are retrieved from the base medium into an retrieval memory, and examined to locate errors revealed by inconsistencies in the error correcting relationship between the "L" inter-locked error checking sets. The errors in the codes of the error checking sets are corrected if any errors exist. The examination and correction steps are iterated until a predetermined error condition has been established.

BRIEF DESCRIPTION OF THE DRAWING

Further objects and advantages of the present data base and the operation of the method will become apparent from the following detailed description and drawing (not drawn to scale) in which.

Figure 1:
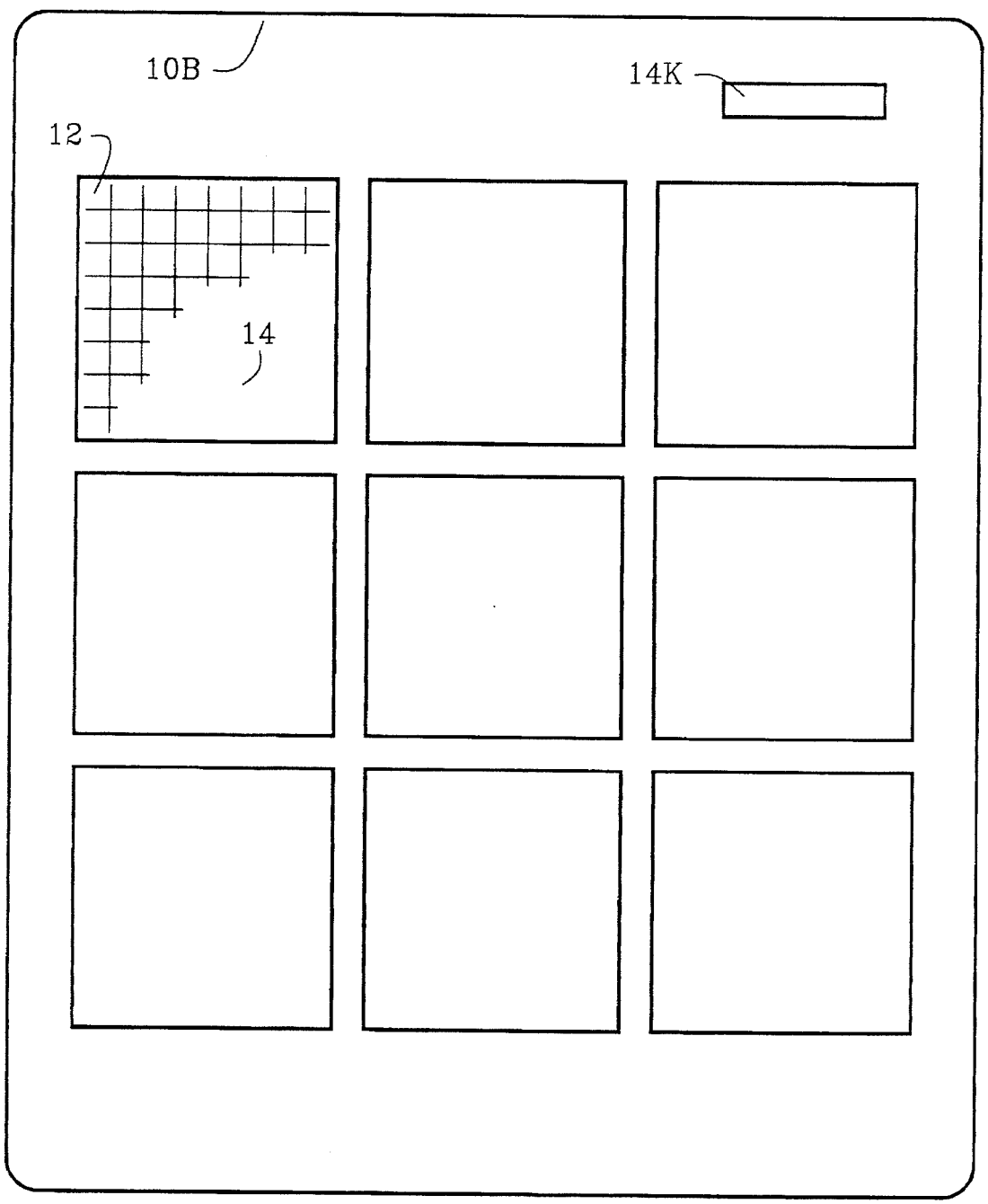
FIG. 1 is a diagram of a record data base printed on a paper base medium.

The first digit of each reference numeral in the above Figures indicates the Figure in which that element is shown. The second digit indicates related structural elements, and the final letter indicates a sub-portion of an element.

GENERAL DATA BASE EMBODIMENT (FIG. 1)

A digital data base 10 having record data codes representing an initial digital record is printed at predetermined code sites 12 within two dimensional code storage area 14 on the surface of on base medium 10B. The digital data base includes redundant check codes and one or more redundant check-check codes for permitting data error and data loss correction. The two dimensional code storage area has a coordinate system for defining code positions therein. The code sites are physically positioned within the code storage area at predetermined coordinates. The bit states of the codes are defined by the presence or absence of toner material deposited on the base medium.

A plurality of error checking sets are formed by the code sites, each containing one or more data codes and one or more check codes. The bits in the check codes in each error checking set are determined by the bits in the data codes of the same error checking set, and are in error correcting relationship therewith. Each data code and each check code are included in "L" error checking sets to provide "L" levels of inter-locking error checking and correcting.

In addition, a of plurality error checking-checking sets are also formed by the code sites. Each error checking-checking set contains one or more check codes and one or more check-check codes. The bits in the check-check codes in each error checking-checking set are determined by the bits in the check codes thereof, and are in error correcting relationship therewith. Each check code and each check-check code are also included in "L" error checking-checking sets to provide "L" Levels of interlocking error checking-checking.

Figure 2:
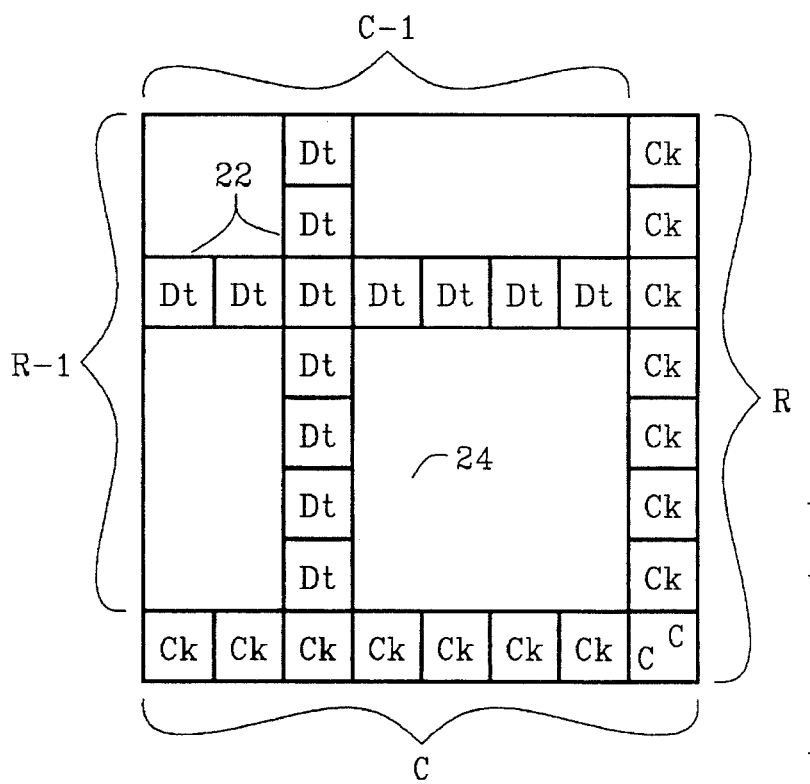
FIG. 2 is a diagram of an embodiment of a code storage area for a record data base having record data codes (Dt) and redundant check codes (Ck)
Figure 3:
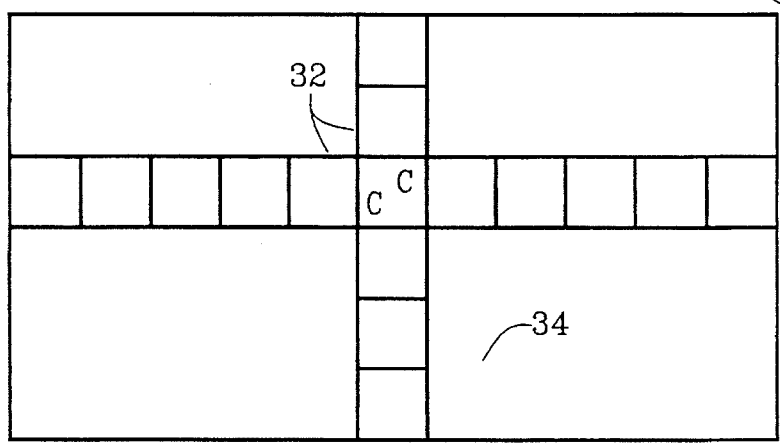
FIG. 3 is a diagram of another embodiment of a code storage area.

CODE CHECKING SETS (FIGS. 2 and 3)

In the row-column embodiment shown in FIG. 2, each code site 22 within the code storage area 24 is positioned along a row axis and also along a column axis forming a pattern of intersecting rows and columns having "R" rows and "C" columns. The coordinate system for defining the position of each code site is a row and column coordinate system. In the embodiment of FIG. 2, the number or rows "R" is equal to the number of columns "C". In the embodiment of FIG. 3, code sites 32 are arranged in storage area 34 with "R" and "C" selected so as not to have a common divider so as to avoid error correction looping.

Each error checking set may be contained along a row or column forming (R-1) row error checking sets and (C-1) column error checking sites as shown in FIG. 2. Each of the R-1 error checking sets has C code sites containing C-1 data codes (Dt) and one check code (Ck); and each of the C-1 column error checking sets has R code sites containing R-1 data codes (Dt) and one check code (Ck). Further, the error checking-checking sets may also be contained along a row or column forming one row error checking-checking set and one column error checking-checking set. The one row error checking-checking set has C sites containing (C-1) check codes (Ck) plus one checking-checking code (CC), and the one column error checking-checking set has R sites containing (R-1) check codes (Ck) plus the one checking-checking code (CC).

In the embodiments of FIGS. 2 and 3, "L" =2. That is, each data code site (Dt) and each check code site (Ck) are included in two checking sets, a row checking set and an intersecting column checking set. Each check code site (Ck) and each check-check code site (CC) are also included in two checking sets, a row checking-checking set and an intersecting column checking-checking set. As a result of the two level row-column configuration, each of the data codes occupies a code site at the intersection of a row and column. Each data code is in error correcting relationship with the C-2 other data codes plus the one check code along that row, and is also in error correcting relationship with the R-2 other data codes plus the one check code along that column. The check codes also occupy a code site at the intersection of a row and column, and are in error correcting relationship with the C-2 other check codes plus one check-check code along that row, and in error correcting relationship with the R-2 other check codes plus one check-check code along that column.

The number of levels "L" may be greater than 2 even though the data base has only two physical dimensions (one row dimension and one column dimension). Mathematical dimensions may be employed which to not correlate with the row and column dimensions. Mathematical dimensions are manifested by lists of addresses in the data base memory.

In the embodiment of FIG. 2, the (C-1) row data check sites (Ck) plus the one check-check code site (CC) forming the row checking-checking set are positioned along an exterior row near the bottom edge of code storage area 24. Similarly, the (R-1) column check code sites (Ck) plus the one check-check code site (CC) forming the column checking-checking set are positioned along the right hand exterior column. The one code checking-checking site (CC) is positioned at the intersection site between the exterior row and the exterior column at a corner of code storage area 24. The exterior position of the checking-checking sets to permit fast reading of the interior record data codes by ignoring the exterior row and column.

In the embodiment of FIG. 3, the row checking set is positioned along an interior row within code storage area 34, and the column checking set is also positioned along an interior column. The one code checking-checking site (CC) is positioned at the intersection site between the interior row and the interior column within code storage area 34.

CODE SITES (FIGS. 4A 4B)

Figure 4A:
FIG. 4A is a diagram of a single data unit with a serial bit format for storage in a code site.
Figure 4B:
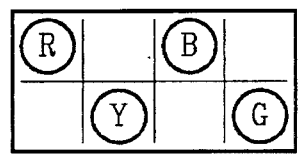
FIG. 4B is a diagram of a single data unit with an E entries out of L locations format.

Preferably, each code site contains a single data unit such as one symbol or character. FIG. 4A shows a conventional code format having "N" (eight) serial bits forming a single byte, which yields 2-to-the-Nth (or 256) possible codes per byte. FIG. 4B shows an "E entries out of L locations" type code format described in U.S. patent application Ser. No. 07/807,227 entitled "DATA FORMAT FOR RECORDING DIGITAL DATA AND METHOD" filed on Dec. 16, 1991 by the present inventor. Toner is deposited in any four of eight locations within the code site. The remaining four locations remain untoned (empty).

The digital format may be binary based, having two code states per bit as shown in FIG. 4A employing a single color recording material such as dark toner against a light base medium. One state is represented by the presence of toner material (solid black dot) and the other state is represented by the absence of toner material (clear dot). The base medium may be any suitable two dimensional sheet like structure such as paper with sufficient body to retain the toner recording material in position within the code site. Paper remains two dimensional in the sense of this invention even though the sheets may curl or become folded into the third dimension. The recording material may be any suitable powder or liquid deposited on the base medium.

Alternatively, the digital format of the codes may be multinary based, having M code states per bit by employing greyscale or colored ink. The greyscale format employs toner material of a single color. The M code states per bit are determined by M greyscale levels. That is, by the intensity of the deposited toner material. The color format (shown in FIG. 4B) is a color based multinary code having employing M colors of toner which provide M code states per bit, yielding M-to-the-Nth possible codes. The embodiment of FIG. 4B employs four entries in eight locations with four colors yielding 256 possible codes. Red color toner is indicated by the dot containing the letter "R". Green toner is indicated by the letter "G". Blue is indicated by the letter "B" and yellow by the letter "Y".

METHOD OF USE (FIGS. 5 and 6A–F)

Figure 5:
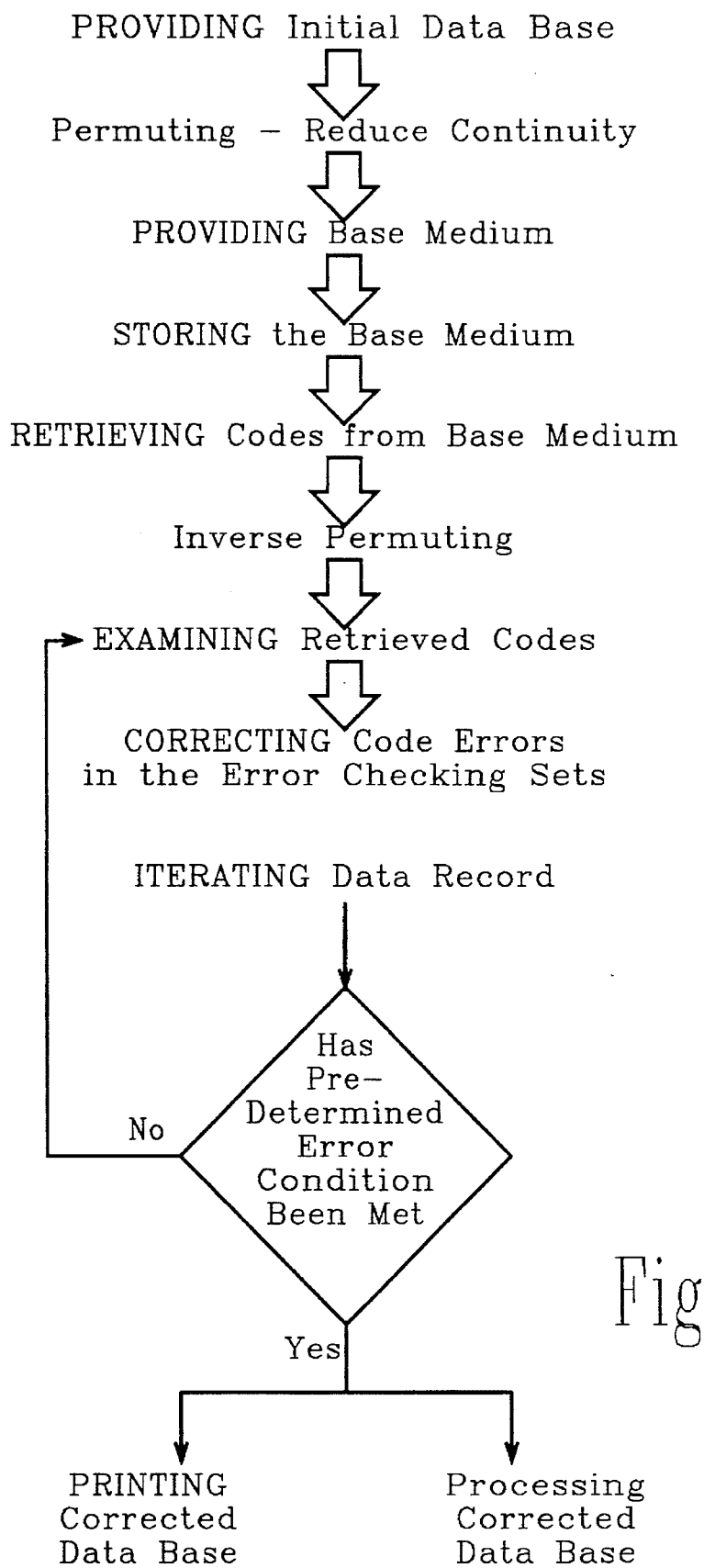
FIG. 5 is a flow chart showing the steps of the method of data correction.

The method of storing and retrieving and correcting a digital data base having record data codes representing an initial digital record is shown in FIG. 5. The stages of the data base are illustrated in FIG. 6A–F. The data base includes redundant check codes and one or more redundant check-check codes which are dependent on the record data codes. The codes are arranged in error checking sets of codes in error correcting relationship. Each code is included in "L" error checking sets to provide "L" levels of inter-locked error checking.

The steps of the method are summarized in FIG. 5 and given in detail below.

Figure 6A:
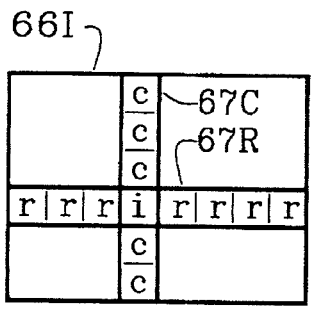
FIGS. 6A–F show the stages of the data base during various steps of the method shown in FIG. 5.

Providing an initial data base in an initial memory of digital record 66I (FIG. 6A). The initial memory is the input mechanism for entering data to be examined and corrected into the system. The initial memory may be any suitable memory device such as a electronic memory or a magnetic memory such as tapes, hard disks or floppy disks.

Figure 6B:
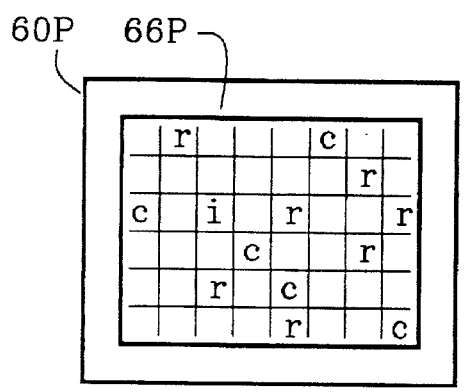

Providing a base medium carrying the codes of the digital data base by printing the initial data base from the initial memory onto a suitable base medium such as paper 60P (FIG. 6B).

Figure 6C:
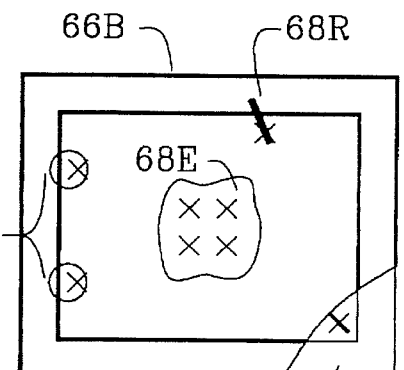

Storing the base medium carrying the codes of the data base (FIG. 6C). Preferably the base medium is stored under conditions suitable for years of storage, perhaps as long as ten or twenty years. Such long term storage is common for data which is very bulky or seldom (if ever) accessed. The data may be "off loaded" from crowded magnetic memory storage, and stored on paper in a cool, dry environment free from silverfish and other life forms.

Figure 6D:
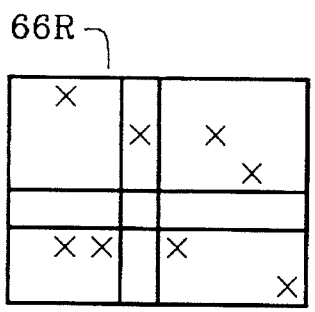

Retrieving the codes from the base medium into an retrieval memory forming retrieved data base 66R (FIG. 6D). A scanning device of appropriate resolution is a suitable device for retrieving the dots of toner and (absence of toner) into binary "1"s and "0"s.

Figure 6E:
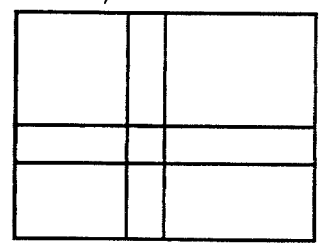

Examining the retrieved codes in each of the error checking sets to locate errors in the data base (FIG. 6E). The errors are revealed by inconsistencies in the error correcting relationship within each error checking set and between the "L" inter-locked error checking sets. The sets of error check codes may extend in rows and columns within an addressable matrix in the retrieval memory. This permits the examining step to proceed along the rows and columns merely by incrementing the row-column access address of the retrieval memory.

Correcting the errors in the codes of the error checking sets if any errors exist.

Iterating the examination and correction steps until a predetermined condition is established (see next section).

Printing the iterated data base onto another base medium 60N (FIG. 6F), which provides an error free (or at least error reduced) copy of the data base. This "refreshed" copy may be used in a present application or returned to in storage for future use.

PREDETERMINED CONDITIONS

The iteration cycles of the examination and correction steps are continued until a desireable predetermined condition is attained. The nature of the predetermined condition depends on the error limitations of the data processing application. The following are some of the predetermined conditions which may stop the iteration cycles and terminate the method.

ALL ERRORS CORRECTED CONDITION

This preferred predetermined condition is attained when all of the errors have been corrected. The corrected condition is manifested by the elimination of inconsistencies in the checking sets and checking-checking sets. The corrected condition may be attained after a single iteration or several iteration cycles. The initial data base may in fact be error free in which case only one examination is required without correction or iteration.

NO CHANGE CONDITION

If the errors and lost data in the initial data base are extensive, complete correction may be impossible. The iteration cycles may be terminated when no more changes appear in the iterated codes. That is, the same errors are detected during the examination step of each iteration, but not corrected during the correction step.

MAXIMUM ITERATION CYCLES

A simple condition to limit the number of iterations to Imax, a predetermined number of cycles. The number Imax is sufficient to eliminate the errors that can be corrected, but small enough to prevent pointless iteration cycles dealing with errors that cannot be corrected. Selection of Imax is a trade-off between speed of operation and degree of correction.

RESIDUAL ERROR DENSITY

If the data base is sufficiently massive, new errors may be generated during each iteration cycle. These new generated errors (plus any incorrectable initial errors) establish a residual error density "E" which cannot be eliminated. The iteration cycles may then be terminated when this residual error density is reduced to below a predetermined acceptable value.

PERMUTATION OF THE DATA BASE (FIGS. 6 ABCDEF)

The record codes may be arranged within the code storage area generally in the same sequence as the codes in the initial record represented by the record data codes. This sequential arrangement provides record continuity between the code storage area and the initial memory. Each code has the same neighbors in both the initial record stored in the initial memory and in the code storage areas printed on the base medium.

Alternatively, the printed codes may be permuted generally out of the sequence of the initial record in order to reduce the record continuity. Each printed code within a permuted data base on the base medium has random neighbors. The data base is later inverse permuted in the retrieval memory to restore the record continuity prior to the examination and correction steps. The permutation and restoration assists in recovering lost data due to "blot" errors resulting from large impairments in the base medium.

FIG. 6A shows initial record data base 66I in the initial memory, illustrating a typical pair of intersecting code checking sets 67R and 67C of the initial record. Row set 67R has eight codes each indicated by an "r"; and column set 67C has six codes each indicated by a "c". The code site at the intersection of row set 67R and column set 67C is indicated by an "i".

FIG. 6B shows permuted data base 66P printed on a base medium 60P resulting from the permutation of record data base 66I of FIG. 6A. The permutation has distributed the codes of row set 67R and column set 67C throughout the storage area to reduce the record continuity. The distribution may be random but inversable based on random inverse keys with encryption potential. Alternatively, the distribution may be systematic and based on a standard permutation key which is included within the initial record as key data. The standard permutation minimizes (or at least greatly reduces) the record continuity of permuted data base 66P. The subsequent inverse permutation restores the record continuity while producing maximum distribution of the blot impairments. The key data defines the permutation of the initial record and the inverse permutation in the retrieval memory. The embodiment of FIG. 1 shows key data 14K carried on the base medium next to storage areas 14.

FIG. 6C shows blot impaired data base 66B resulting from the extensive use and long storage of printed data base 60P of FIG. 6B. Data impairments have many forms including data processing errors caused by insufficient electronic signal-to-noise and printing errors caused by toner deposited in the wrong amount or at the wrong place. However the impairment shown in FIG. 6C are blot impairments extending over adjacent rows and adjacent columns. The lost codes within these blot impairments are indicated by an "x" in FIG. 6C, and are particularly troublesome because they are clustered together in blots.

Some blot impairments may result from accidental spills a harmful substances over the base medium which removes or discolors the toner. Other blot impairments are caused by loss of contrast due between the dark toner and the light base medium to aging. The pigment in the toner may fade and the paper may turn yellow or brown over the years of storage. The resulting physical signal-to-noise may be insufficient to maintain error free scanning.

A major cause of blot impairments is holes in the base medium caused by punch holes 68P, stable rips 68R, torn corners 68T or burrows 68E excavated by silverfish and other pests.

FIG. 6D shows retrieved data base 66R in the retrieval memory resulting by the scanning and inverse permutation of impaired data base 66B of FIG. 6C. The codes of typical row checking set 67R and typical column checking set 67C have been restored to their original discrete format of an intersecting row and column. The restored positions of row set 67R and column set 67C correspond to their initial positions in initial record data base 66I. The clusters of lost codes (each indicated by an "x") caused by the blot impairments have been distributed throughout the retrieved data base 66R due to the inverse permutation.

FIG. 6E shows corrected data base 66C in the retrieval memory resulting from the examination and correction of the retrieved data base of FIG. 6D. The lost data has been salvaged by means of the redundant codes and the in error correcting relationship between the code sets.

Figure 6F:
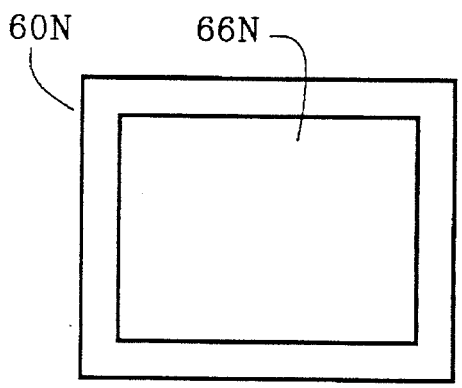

FIG. 6F shows new data base 60N printed on a new base medium, which provides an error free (or at least error reduced) copy of the data base. This "refreshed" data base 60N may be used in a present application or returned to in storage for future use.

The specific additional steps of the permutation and restoration of the data base as show in FIGS. 6A 6B 6C 6D 6E and 6F are summarized below.

Permuting the sequence of the initial delta in initial data base 66I prior to the printing step.

Inverse permuting the sequence of the iterated data in retrieval data base 66R after the step of retrieving to restore the sequence of the initial data.

Providing a new base medium carrying the codes of the digital data base by printing corrected data base 66C from the retrieval memory onto a suitable new base medium such as paper 60N (FIG. 6F).

SPECIFIC EMBODIMENT

The following particulars of the data base and error correcting method are given as an illustrative example. The data density of the data base may by 10,000 codes per square inch (4 entries in 8 locations, see FIG. 4B) which can be read by at a scanner resolution of 400 dpi. The ratio of record data codes to redundant check codes plus check-check codes may be 4:1. That is, the record data codes may occupy 80% of the toned storage area on the paper, and the error correcting codes (such els Reed-Solomon) may occupy the remaining 20%. Suitable techniques such as Berlekamp's iterative algorithm may be employ in the error correction as described in detail in the text "Error Control Coding: Fundamentals and Applications" (pages 170–177) by Shu Lin and Daniel J. Costello, Jr, and published by Prentice-Hall, Inc, Englewood Cliffs N.J. (copyright 1983). The above specific example is not intended as defining the limitations of the invention. Numerous other applications and configurations are possible.

INDUSTRIAL APPLICABILITY

It will be apparent to those skilled in the art that the objects of this invention have been achieved as described hereinbefore.

Clearly various changes may be made in the structure and embodiments shown herein without departing from the concept of the invention. Further, features of the embodiments shown in the various Figures may be employed with the embodiments of the other Figures.

Therefore, the scope of the invention is to be determined by the terminology of the following claims and the legal equivalents thereof.

I CLAIM AS MY INVENTION;

1. A digital data base having record data codes representing an .initial digital record, and having redundant check codes and one or more redundant check-check codes, comprising:

a base medium a two dimensional code storage area on the surface of the base medium having a coordinate system for defining positions therein;

code sites physically positioned within the code storage area at predetermined coordinates for containing the record data codes and the redundant check codes and the redundant check-check codes, and having code bit states defined by the presence or absence of toner material deposited on the base medium;

a plurality of error checking sets formed by the code sites, each error checking set containing one or more data codes and one or more check codes, the bits in the check codes in each error checking set determined by the bits in the data codes of the same error checking set and in error correcting relationship therewith, each data code site and each check code site are included in "L" error checking sets to provide "L" levels of interlocking error checking; and a plurality of error checking-checking sets formed by the code sites, each error checking-checking set containing one or more check codes and one or more check-check codes, the bits in the check-check codes in the error checking-checking set determined by the bits in the check codes thereof and in error correcting relationship therewith.

2. The digital data base of claim 1, wherein each check code site and each check-check code site are included in "L" error checking-checking sets to provide "L" levels of interlocking error checking-checking.

3. The digital data base of claim 1, wherein each code site within the code storage area is positioned along a row axis and along a column axis forming a pattern of intersecting rows and columns having "R" rows and "C" columns, and the coordinate system for defining the position of each code site is a row and column coordinate system.

4. The digital data base of claim 3, wherein the number or rows "R" is equal to the number of columns "C".

5. The digital data base of claim 3, wherein the number or rows "R" and the number of columns "C" do not have a common divisor.

6. The digital data base of claim 3, wherein each of the error checking sets is contained along a row or column forming (R-1) row error checking sets and (C-1) column error checking sets, and each of the error checking-checking sets is contained along a row or column forming one row error checking-checking set and one column error checking-checking set.

7. The digital data base of claim 6, wherein each of the R-1 error checking sets has C code sites containing C-1 data codes and one check code, and each of the C-1 column error checking sets has R code sites containing R-1 data codes and one check code, and the one row error checking-checking set has C sites containing (C-1) check codes plus one check-check code, and the one column error checking-checking set has R sites containing (R-1) check codes plus one check-check code.

8. The digital data base of claim 7, wherein"L" =2, and each data code and each check code are included in one row checking set and in one intersecting column checking set, and each check code and each check-check code are included in one row checking-checking set and in one intersecting column checking-checking set.

9. The digital data base of claim 8, wherein each of the data codes occupies a code site at the intersection of a row and column, and is in error correcting relationship with the C-2 other data codes plus the one check code along that row, and is also in error correcting relationship with the R-2 other data codes plus the one check code along that column.

10. The digital data base of claim 9, wherein each of the check codes occupies a code site at the intersection of a row and column, and is in error correcting relationship with the C-2 other check codes plus one check-check code along that row, and is also in error correcting relationship with the R-2 other check codes plus one check-check code along that column.

11. The digital data base of claim 7, wherein the (C-1) row data code sites with one check code site are positioned along an exterior row along the edge of the code storage area, and the (R-1) column data code sites with one check code site are positioned along an exterior column along the edge of the code storage area, and the one code check-check site is positioned at the intersection site at a corner of the code storage area between the exterior row and the exterior column.

12. The digital data base of claim 7, wherein the (C-1) row check code sites with one check-check code site are positioned along an interior row within the code storage area, and the (R-1) column check code sites with one check-check code site are positioned along an interior column within the code storage area, and the one code check-check site is positioned at the intersection site within the code storage area between the interior row and the interior column.

13. The digital data base of claim 1, wherein the record data codes are arranged within the code storage area generally in the sequence of the initial record represented by the record data codes for providing record continuity between the record data codes within the code storage area and the record.

14. The digital data base of claim 1, wherein the record data codes are arranged within the code storage area are permuted generally out of the sequence of the initial record represented by the record data codes for reducing the record continuity between the record data codes within the code storage area and the record.

15. The digital data base of claim 14, further comprising key data for defining the permuting of the initial record.

16. The digital data base of claim 1, wherein the digital format of the codes is binary based having two code states per bit, one state represented by the presence of toner material and the other state represented by the absence of toner material.

17. The digital data base of claim 1, wherein the digital format of the codes is multinary based having M code states per bit.

18. The digital data base of claim 17, wherein the toner material is a single color and the deposition thereof is in greyscale and the M code states per bit are determined by the intensity of toner material deposited.

19. The digital data base of claim 17, wherein the toner material has M colors and the M code states per bit are determined by the selection of the toner material deposited to form each bit.

20. A method of storing and retrieving and correcting a digital data base having record data codes representing an initial digital record, and having redundant check codes and one or more redundant check-check codes, said method comprising the steps of:

providing a base medium comprising on the surface a two dimensional code storage area having a coordinate system for defining positions therein and carrying the codes of the digital data base by printing the data codes, the redundant check codes, and the redundant check-check codes at code sites in which code bit states are defined by the presence or absence of toner material deposited on the base medium and the code sites are physically positioned within the code storage area at predetermined coordinates, wherein a plurality of error checking sets are formed by the code sites, each error checking set containing one or more data codes and one or more check codes, the bits in the check codes in each error checking set are determined by the bits in the data codes of the same error checking set and are in error correcting relationship therewith, each data code site and each check code site are included in "L" error checking sets to provide "L" levels of inter-locking error checkings and a plurality of error checking-checking sets are formed by the code sites, each error checking-checking set containing one or more check cedes and one or more check-check codes, the bits in the check-check codes in each error checking-checking set are determined by the bits in the check codes thereof and are in error correcting relationship therewith;

retrieving the codes from the base medium into a retrieval memory;

examining the retrieved codes in each of the error checking sets to locate errors revealed by inconsistencies in the error correcting relationships within each error checking set and between the "L" inter-locked error checking sets;

correcting the errors in the codes of the error checking sets if any errors exist; and iterating the examining and correcting steps until a predetermined error condition has been established in the digital data base.

21. The method of claim 20, wherein the examining and correcting steps are iterated until all of the errors have been corrected.

22. The method of claim 20, wherein the examining and correcting steps are iterated until no changes appear in the iterated codes.

23. The method of claim 20, wherein the examining and correcting steps are iterated a maximum of Imax times.

24. The method of claim 20, wherein the examining and correcting steps are iterated until the number of errors "E" in the iterated codes is less than a predetermined value.

25. The method of claim 20, comprising the further step of printing the iterated data base onto another base medium.

26. The method of claim 20, wherein the sets of error check codes extend in rows and columns within an addressable matrix in the retrieval memory, and the examining step proceeds along the rows and columns by incrementing the access address of the retrieval memory.

27. The method of claim 20, wherein, prior to the step of providing the base medium, said method comprises the further step of providing an initial data base of the digital record in an initial memory.

28. The method of claim 27, in which, prior to the step of providing the base medium, said method comprises the further step of permuting the sequence of the initial data.

29. The method of claim 28, wherein the step of permuting the sequence of the initial data reduces the record continuity of the initial data base as printed on the base medium.

30. The method of claim 29, wherein the step of permuting the initial data is performed using a standard permutation key.

31. The method of claim 28, in which after the step of retrieving, comprises the further step of inverse permuting the sequence of the iterated data in the retrieval memory to restore the sequence of the initial data.

32. The method of claim 31, wherein the step of inverse permuting the sequence of the iterated data distributes storage impairments throughout the printed data base.

* * * * *